United States Patent [19]

Griffith

[11] Patent Number: 4,882,073
[45] Date of Patent: Nov. 21, 1989

[54] METHOD AND SYSTEM FOR RECOVERY OF PLASTICS FROM A SETTLING BASIN

[75] Inventor: Kenneth L. Griffith, Dickinson, Tex.
[73] Assignee: T.D.K. Plastics, Inc., Dickinson, Tex.
[21] Appl. No.: 199,852
[22] Filed: May 27, 1988
[51] Int. Cl.[4] .............................................. B01D 29/04
[52] U.S. Cl. ................................ 210/776; 210/242.1; 210/416.1; 405/63
[58] Field of Search ................... 210/776, 924, 416.1, 210/242.1, 241, 923; 405/63, 65

[56] References Cited

U.S. PATENT DOCUMENTS

| | | | |
|---|---|---|---|
| 1,397,891 | 11/1921 | Jones | 210/242.3 |
| 1,437,007 | 11/1922 | Otterson | 210/241 |
| 3,578,171 | 5/1971 | Usher | 210/242.3 |
| 3,584,462 | 6/1971 | Gadd | 210/242.3 |
| 3,650,406 | 3/1972 | Brown et al. | 210/242.4 |
| 3,666,098 | 5/1972 | Garland et al. | 210/776 |
| 3,727,766 | 4/1973 | Horne et al. | 210/776 |
| 3,730,346 | 5/1973 | Prewitt | 210/776 |
| 3,779,385 | 12/1973 | Strohecker | 210/242.3 |
| 3,849,308 | 11/1974 | Westerman | 210/776 |
| 3,850,807 | 11/1974 | Jones | 210/242.3 |
| 3,928,206 | 12/1975 | Waren | 210/776 |
| 3,944,489 | 3/1976 | Derzhavets et al. | 210/776 |
| 3,983,034 | 9/1976 | Wilson | 210/776 |
| 4,006,082 | 2/1977 | Irons | 210/776 |
| 4,008,156 | 2/1977 | Chastan-Bagnis | 210/242.1 |
| 4,032,449 | 6/1977 | De Visser et al. | 210/242.1 |
| 4,154,678 | 5/1979 | Kole | 210/242.1 |
| 4,209,400 | 6/1980 | Mayes | 210/776 |
| 4,356,094 | 10/1982 | Ross | 210/774 |
| 4,702,832 | 10/1987 | Renfrow | 210/242.3 |
| 4,707,277 | 11/1987 | Mims | 210/241 |

FOREIGN PATENT DOCUMENTS 189188 4/1964 Sweden ................................ 405/63

OTHER PUBLICATIONS

Flygt AB pump, 3102.180 and 3127.180 Installation, Care and Maintenance.

Primary Examiner—Richard V. Fisher
Assistant Examiner—Coreen Y. Lee
Attorney, Agent, or Firm—Pravel, Gambrell, Hewitt, Kimball & Krieger

[57] ABSTRACT

A system for recovery of plastic material floating on the surface of water in a settling basin is disclosed. The system includes a transportable trailer having a hoist extendable from the trailer. Additionally, the trailer includes a floating boom structure extendable between the shoreline of the basin for dividing the basin into a first surface area and a second surface area both containing floating plastic material. The trailer further includes a pump suspendable from the hoist for pumping the plastic material from the settling basin to a transportable container positioned on the shore of the settling basin. The pump includes an intake base that is positioned at a predetermined distance below the surface of the settling basin to aid in the operation of the system. The plastic recovery system of the present invention provides a method to quickly and efficiently recover plastic materials floating on the surface of the water while increasing the safety to the operator of the system during its operation.

4 Claims, 2 Drawing Sheets

METHOD AND SYSTEM FOR RECOVERY OF PLASTICS FROM A SETTLING BASIN

BACKGROUND OF THE INVENTION

1. Technical Field of the Invention

This invention relates to a system and method for recovery of plastic, particularly for recovery of plastic floating in a settling basin.

2. Description of the Prior Art

Several types of systems have been used in the past for recovery of plastics in settling basins or ponds. As a bi-product in the manufacture of plastic goods, plastic polymer pellets or materials are discharged into settling basins. As the value of these discharged plastic pellets has increased recently, their recovery from these basins has become commercially desirable. In the past the recovery methods from these relatively shallow and contained settling basins have been crude and labor intensive. Some recovery methods used in the past include individuals positioned either on the shore, in small boats or on floating platforms to manually recover the plastic material using nets or an open ended suction hose that required the individual to move to the floating plastic material for its recovery. As is apparent, these past methods and system were time consuming and not cost effective.

In non-analogous arts there has been apparatus disclosed for removing undesirable floating oil or other hazardous liquid spills to prevent contamination of water, deterioration of shoreline land values, the loss of animal life and fire hazards. U.S. Pat. No. 3,578,171 issued May 11, 1971 discloses an oil spill clean-up apparatus including an anti-pollution barge floating on the surface of the contaminated water to skim and pump the oil slick into floating settling tanks towed by the barge. The barge further includes a swing boom from which a skimmer assembly is suspended and positioned below the surface of the water. The skimmer assembly includes a grilled or screened intake communicating with a skimmer hose extending below the screened intake. This skimmer hose is connected to a pump located on the deck of the barge.

The '171 patent also discloses the use of a slick bar or buoyant confining devices to contain the oil slick for subsequent pumping by the skimmer assembly. Additionally, a buoyant tubular conduit having a series of longitudinal spaced inwardly facing air ports is disclosed for the purpose of confining the floating oil. Also, disclosure is made in the '171 patent for providing a power-operated air blower by which oil pollutants may be moved within a flexible slick bar and thus be eventually encircled for the purpose of skimming. The preferred embodiment of the '171 barge is approximately 36 to 40 feet long and 10½ to 12 feet wide, weighing approximately 8,000 pounds.

SUMMARY OF THE INVENTION

Briefly, according to the present invention, a system for recovery of plastic material floating on the surface of water in a settling basin is provided. The system includes a transportable trailer having a fixed support member extending from the trailer. Additionally, the trailer includes a removable floating boom structure extendable between the shoreline of the basin for dividing the basin into a first surface area and a second surface area. The first and second surface areas containing the floating plastic material.

The trailer further includes a pump means suspendable from the support member for pumping the plastic material from the settling basin to a transportable container positioned on the shore of the settling basin. The pump means includes an intake base means which is positioned at a predetermined distance below the surface of the settling basin to aid in the operation of the system.

The plastic recovery system of the present invention provides a method to quickly and efficiently recover plastic materials floating on the surface of the water while increasing the safety to the operator of the system during its operation.

BRIEF DESCRIPTION OF THE DRAWINGS

The objects, advantages and features of the invention will become more apparent by reference to the drawings which are appended hereto wherein like numerals indicate like parts, wherein an illustrative embodiment of the invention is shown, of which.

DESCRIPTION OF THE PREFERRED EMBODIMENT

Figure 1:
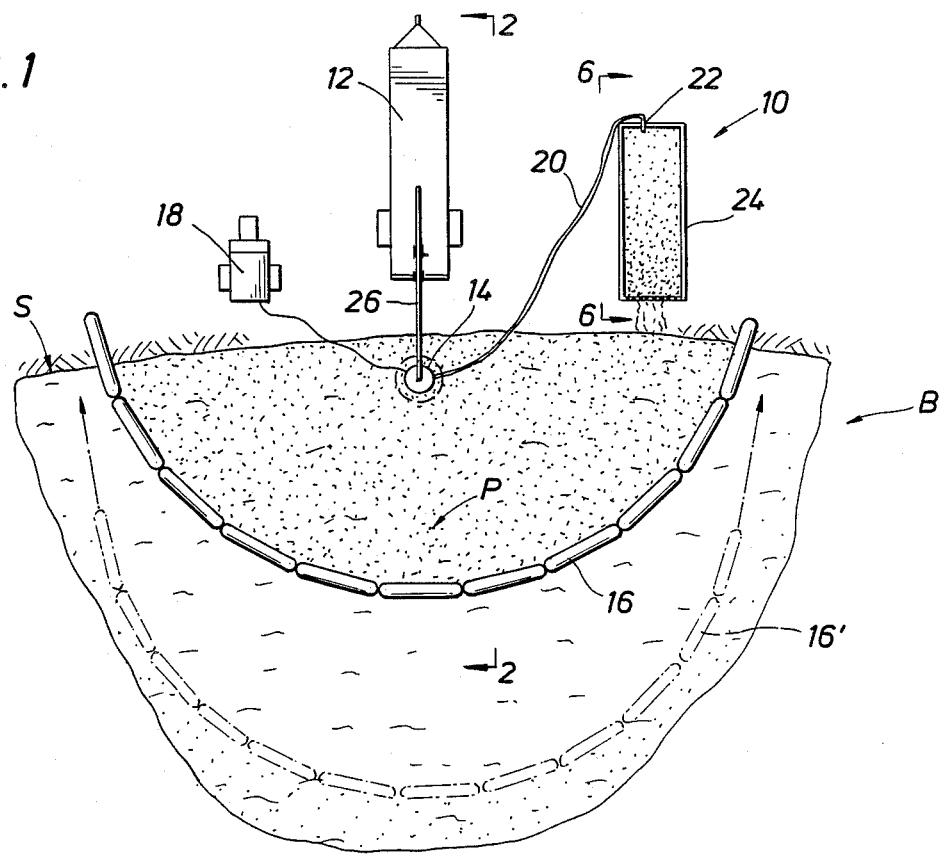
FIG. 1 is a plan view of the plastic recovery system according to the present invention illustrating the moving of the floating boom structure from a first position to a second position.

The plastic recovery system of the present invention, indicated generally at 10, in FIG. 1 allows the operator of the system to conveniently and efficiently transport, assemble and utilize the plastic recovery system at a plurality of settling basins. The preferred plastic recovery system 10 includes a trailer 12, a pump means 14 and a floating boom structure 16 which are used in combination with other elements to provide a cost effective means for recovery of plastics in settling basins. The system further preferably includes a power supply 18, flexible hose 20, rigid hose 22, transportable open top container 24 and a support member or hoist 26 which will be discussed in detail below.

The typical settling basin that this system is used has a maximum depth of approximately 8 feet and an average diameter of approximately 200 feet. As best can be seen in FIG. 1, the shoreline S divides the settling basin from the shore.

For recovery of the plastic materials, the operator transports the trailer 12 storing the support member 26, the pump means 14, the flexible hose 20 and the rigid hose 22, along with the floatable boom structure 16. The power supply 18 could be positioned on the trailer but is preferably, as shown in FIG. 1, a stand-alone unit having its own wheels to allow pulling by a suitable vehicle. Also independently transportable to the settling basin site is a container 24 which is used for separating the plastic material from the water as will be discussed in detail below.

Figure 3:
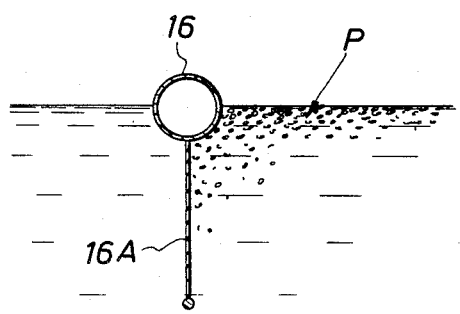
FIG. 3 is a detailed enlarged view of the floating boom structure and its attached flap as shown in FIG. 2.
Figure 4:
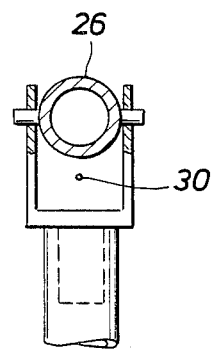
FIG. 4 is an enlarged section view taken along lines 4—4 of FIG. 2.
Figure 2:
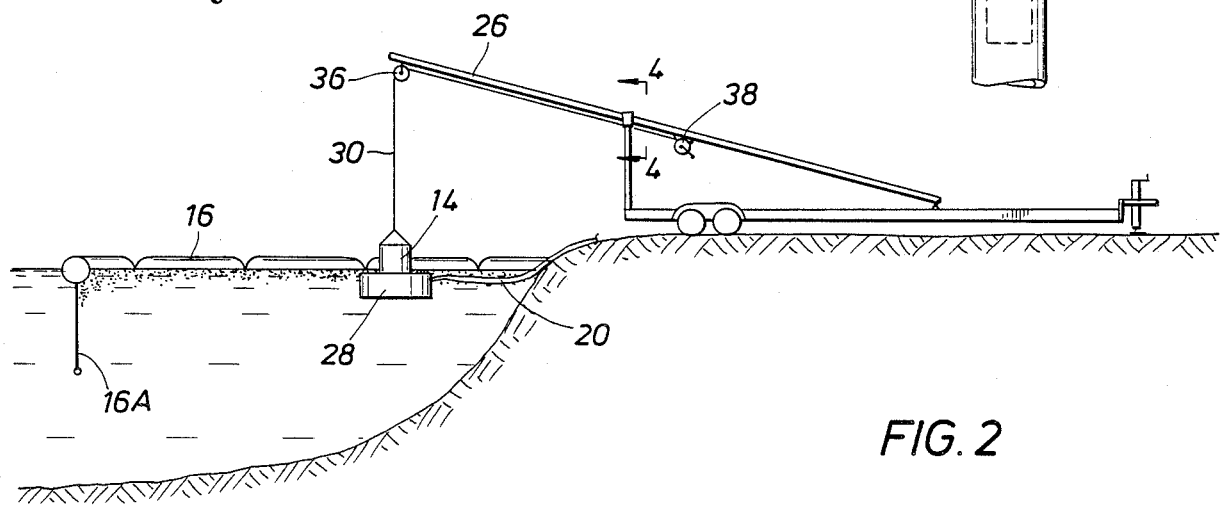
FIG. 2 is an elevational view taken along line 2—2 of FIG. 1.
Figure 5:
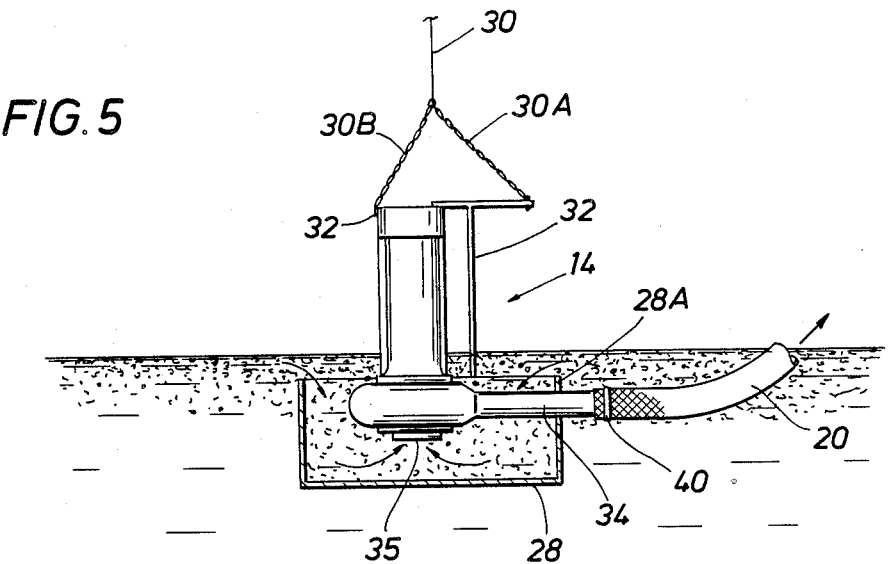
FIG. 5 is an enlarged detailed sectional view of the pump means of the present invention better illustrating the intake base means and discharge outlet and intake of the pump.

As can be seen best in FIGS. 3 and 5, the plastic material both floats on the surface and is suspended in the water adjacent to the surface of the water across the entire settling basin when the operator first appears at the job site. The floating boom structure 16', as shown in dashed lines in FIG. 1, preferably a 100-foot or longer simplex oil boom, is extended across the settling basin between the shoreline. As best shown in FIGS. 2 and 3, the floating boom structure 16 is continuous and includes a 12 inch flap 16A that serves as a scoop to catch all suspended plastic material P and to prevent its escape as the boom structure 16 moves from its first position to its second compressed position.

The placement of the boom in the basin is determined by the desired amount of plastic material to be moved toward the predetermined pumping location. Preferably the entire boom structure having an attached rope at each of its ends is initially positioned on a shoreline. The rope, of sufficient length to extend from the initial position on the shoreline to another shoreline, is provided so that the operator may walk along the shoreline with the rope and when the operator arrives at a desired location the boom is extended across the basin by pulling the rope attached to one end of the boom so as to extend the boom structure across the basin for subsequent operation of the system.

As best seen in FIG. 1, the floating boom structure is then moved from its first position, as seen by the floating boom structure 16' in the dashed lines, to a second position as shown by the floating boom structure 16 in solid lines. The floating boom structure is moved toward the shoreline to a predetermined pumping location and in the process compresses the floating plastic material from a first surface area determined by the area of the shoreline S and the floating boom structure 16' to a smaller third surface area as defined by the shoreline and the floating boom structure 16, as seen in FIG. 1. The boom structure 16 is then secured to the shore by fastening the rope to pins or other fastening means.

As best shown in FIG. 5, the pump means 14, is preferably a Model CS3102 Skimmer Assembly Pump manufactured by Flygt Corporation of Norwalk, Connecticut, a subsidiary of ITT. The pump means 14 includes an intake or skimmer base means 28 secured thereon and both are balanced and suspended from ⅜" steel cable 30 movably attached to the support member 26 of trailer 12. Frame 32 allows the balancing of the pump means 14 so that the longitudinal top edge surface 28A of the intake base 28 is properly horizontally orientated to achieve to proper operation of the system. The chain members 30A and 30B are connected to this frame 32, as shown in FIG. 5, so as to achieve the desired balancing. The intake base means 28 and the frame of the present invention are fabricated by Hahn Equipment of Houston, Texas. Preferably, the discharge outlet 34 of the pump means 14 is a 4" nominal size and the pump weighs 245 pounds though other size outlets could be used. The intake 35 is located at the bottom of the pump means 14 to ensure a proper skimming effect. The pump means 4 is preferably a 5.0 horsepower, 1750 RPM, 3-phase 60 HZ having a voltage of 200 230/460 or 575 with a wastewater impeller No. 433. Preferably, the intake base means 28 has a bottom length of 24" and a height of 12".

Cable 30 runs through a pulley 36 attached to the end of the 20 foot long, 2 inch diameter steel pipe or support member 26. The cable 30 is wound to a winch 38 secured to the support member or hoist 26 for the lowering and raising of the attached pump means 14. After the pump means 14 is raised approximately 2 to 3 feet off the ground, the trailer 12 is backed up to the edge of the shoreline and the pump means 14 is lowered into the settling pond and submersed to the predetermined distance below the surface of the water. Through substantial experimentation and trial and error studies, it has been found that the top edge 28A of the intake base means 28 should be 2" to 3" below the surface of the water to provide the best mode of operation of the system.

Though not shown, the pump means 14 is then secured to the shoreline by attaching an additional chain to the pump, preferably to frame 32 as shown in FIG. 5, and the other end is secured to the shore. The pump means 14 is then electrically connected to the power supply 18. Preferably, the power supply is a 35 kilowatt generator that is diesel powered. One proven generator unit is the mobile power system provided by Earth Energy Systems, Inc. of Eden Prairie, Minnesota.

Figure 6:
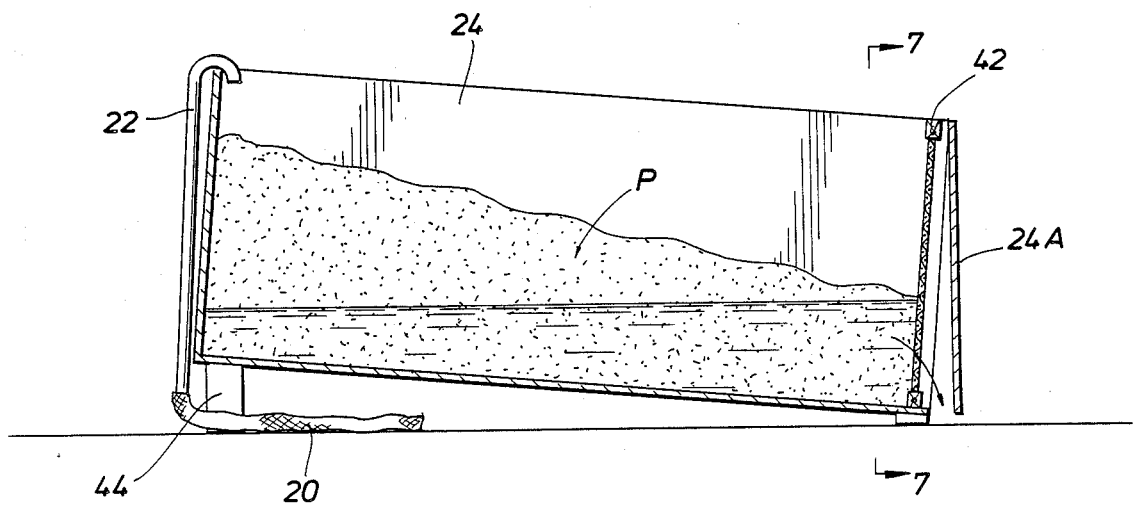
FIG. 6 is a section view taken along lines 6—6 of FIG. 1.

Next, a 4" flexible hose 20, preferably 100 feet in length, is attached to the discharge outlet 34 with a conventional coupling 40. The other end of the flexible hose is then connected to a rigid hose 22, approximately 10 feet in length and also having a diameter of 4", so as to prevent collapsing of the hose or restriction of the hose during operation of the system. As best seen in FIGS. 1 and 6, the 4" rigid hose is positioned to allow discharge into the 30 yard open top transportable container 24. The hose 22 is securedly attached, preferably by rope, to the container 24 to prevent any inadvertent removal during the operation.

Figure 7:
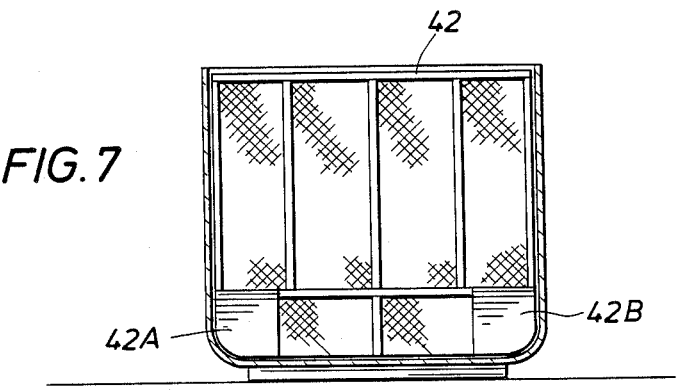
FIG. 7 is a section view taken along lines 7—7 of FIG. 6.

As can best be seen in FIGS. 6 and 7, the conventional container has a swinging hinged lid 24A at its opening. Desirable to the invention, a novel screening device 42 is fabricated so as to retrofit into the container against the opening to allow water to escape back to the basin, as seen in FIG. 1, yet retain the plastic material or pellets P in the container 24 for subsequent transporting. The filter screen device 42 includes a frame member, preferably a wooden 2×4 frame member, covered with ¼' screen to provide structural integrity to the device 42 along with a 1/16" fine filter mesh screen to allow water to escape while retaining the plastic P. As best shown in FIG. 7, the screen device 42 additionally includes plates 42A and 42B to direct the flow of water toward the bottom center of the opening of the container 24. Prior to the operation of the system, the container 24 is desirably positioned on a block 44 so as to tilt the container to induce gravity flow of the water through the filter device 42 as indicated by the arrow in FIG. 6.

After the above components have been positioned and the plastic material moved towards the properly positioned pump means 14, as described above, the generator or power supply 18 is then started and the voltage adjusted preferably to 480 volts. The pump is then turned on by main breakers positioned at the power supply and the pump, properly positioned and as shown in FIGS. 2 and 5, is allowed to pump for at least 30 minutes for pumping both the plastic material and the water into the container 24, as discussed above.

The generator is then turned off and the water allowed to escape through the filter device 42, as discussed above, which normally takes 10 minutes. The reactivation of the generator pump is then repeated for 30 minutes cycles until the first container or a subsequent containers are either full of plastic pellets or the job has been completed.

After the job has been completed, it is has been found desirable, after raising the pump means 14, to clean all plastic material from the inside of the pump. After disconnecting the discharge hose 20 by coupling 40, clear water is allowed to run through the pump for approximately 5 minutes until the pump has been cleared of all remaining plastic that may possibly exist in the impeller and could create possible start up problems when preparing to start the next plastic recovery job.

After the pump is cleaned, all the components including the hoses 20 and 22, ropes, chains, boom structure 16, pump means 14 are all loaded and stored on the trailer to allow their subsequent relocation to the next job site. The trailer 12 of the preferred embodiment is a 16' low boy trailer having a dual axle and a rolling tailboard.

As is now apparent, this novel and unobvious method and system does not require the operator to enter the water or use a boat to recover the plastic material, thus providing increased safety to the operator.

Various modifications and alterations in the disclosed system and method will be apparent to those skilled in the art of the foregoing description which does not depart from the spirit of the invention. For this reason, these changes are to be considered included in the appended claim. The appended claims recite the only limitation to the present invention, and the descriptive manner which is employed for setting forth the embodiment is to be interpreted as illustrative and not a limitation.

I claim:

1. Method for recovery of plastic material floating near the surface of a body of water in a settling basin, said basin being defined by a surrounding shoreline, comprising the steps of:

transporting a trailer having a support member to the shoreline adjacent to a defined pump area of a basin so that one end of the support member extends over the water in the basin;

suspending a pumping means from the support member;

positioning a first end of a plastic material moving flexible floating boom means at a first location on the shoreline;

positioning a second end of the flexible floating boom means at a second location on the shoreline;

moving one or both ends of the floating boom means along the shoreline to concentrate the floating plastic material in the defined pumping area in the basin, said pumping area being defined by the portion of the shoreline between the first and second ends of the floating boom means, and the floating boom means;

positioning the inlet of the pumping means so that the upper most edge of an intake base means of the pumping means is greater than two inches below the surface of the water in the basin;

pumping a portion of the water and the floating plastic material from within the pumping area to a transportable container positioned on the shoreline of the basin; and retaining the plastic material in the transportable container while allowing the water to pass through a screen in the container to return to the basin.

2. The method of claim 1 further comprising the step of:

providing a movable power supply for operating the pump means.

3. The method of claim 1 further including the step of:

storing the floating boom means and the pumping means on a transportable trailer.

4. The method of claim 1, wherein the step of positioning the inlet of the pumping means comprises positioning the uppermost edge defining the inlet to a depth in the range of greater than two but less than three inches below the surface of the fluid in the basin.

* * * * *